United States Patent [19]
Brockmüller et al.

[11] 3,908,527
[45] Sept. 30, 1975

[54] APPARATUS FOR FORMING LOOSE PACKETS OF FLAT WORKPIECES

[75] Inventors: Friedrich Franz Brockmüller; Richard Feldkämper, both of Lengerich of Westphalia, Germany

[73] Assignee: Windmoller & Holscher, Lengerich of Westphalia, Germany

[22] Filed: Dec. 12, 1973

[21] Appl. No.: 424,074

[30] Foreign Application Priority Data
Dec. 13, 1972  Germany............................ 2261005

[52] U.S. Cl............... 93/93 DP; 93/93 HT; 198/35
[51] Int. Cl.²........................................... B31B 1/98
[58] Field of Search ............ 271/64, 189, 201, 217, 271/218; 198/35; 93/93 C, 93 DP, 93 R, 93 HT

[56] References Cited
UNITED STATES PATENTS

| | | | |
|---|---|---|---|
| 3,080,043 | 3/1963 | Johansen et al. | 198/35 |
| 3,231,100 | 1/1966 | Faeber | 271/218 X |
| 3,362,707 | 1/1968 | Lauren | 271/218 |
| 3,390,619 | 7/1968 | Williams | 93/93 C |
| 3,719,357 | 3/1973 | Shields | 271/201 X |
| 3,772,971 | 11/1973 | Dutro et al. | 93/93 C |

*Primary Examiner*—Granville Y. Custer, Jr.
*Assistant Examiner*—James F. Coan
*Attorney, Agent, or Firm*—Fleit & Jacobson

[57] ABSTRACT

In apparatus for forming loose packets of predetermined numbers of superposed flat workpieces from a row of such workpieces which are subsequently placed in an overlapping formation on a conveyor, brake means are provided effective to engage the workpieces and cause same temporarily to build up and interrupt the flow of the overlapping formation each time a predetermined number of workpieces for a packet has been reached. Two packeting stations are provided downstream of a second conveyor, each packeting station including an abutment extending transversely to the conveying direction. The positions of the packeting stations relatively to the second conveyor are adjustable so that the overlapping flow is directed alternately to one said station and the other.

13 Claims, 3 Drawing Figures

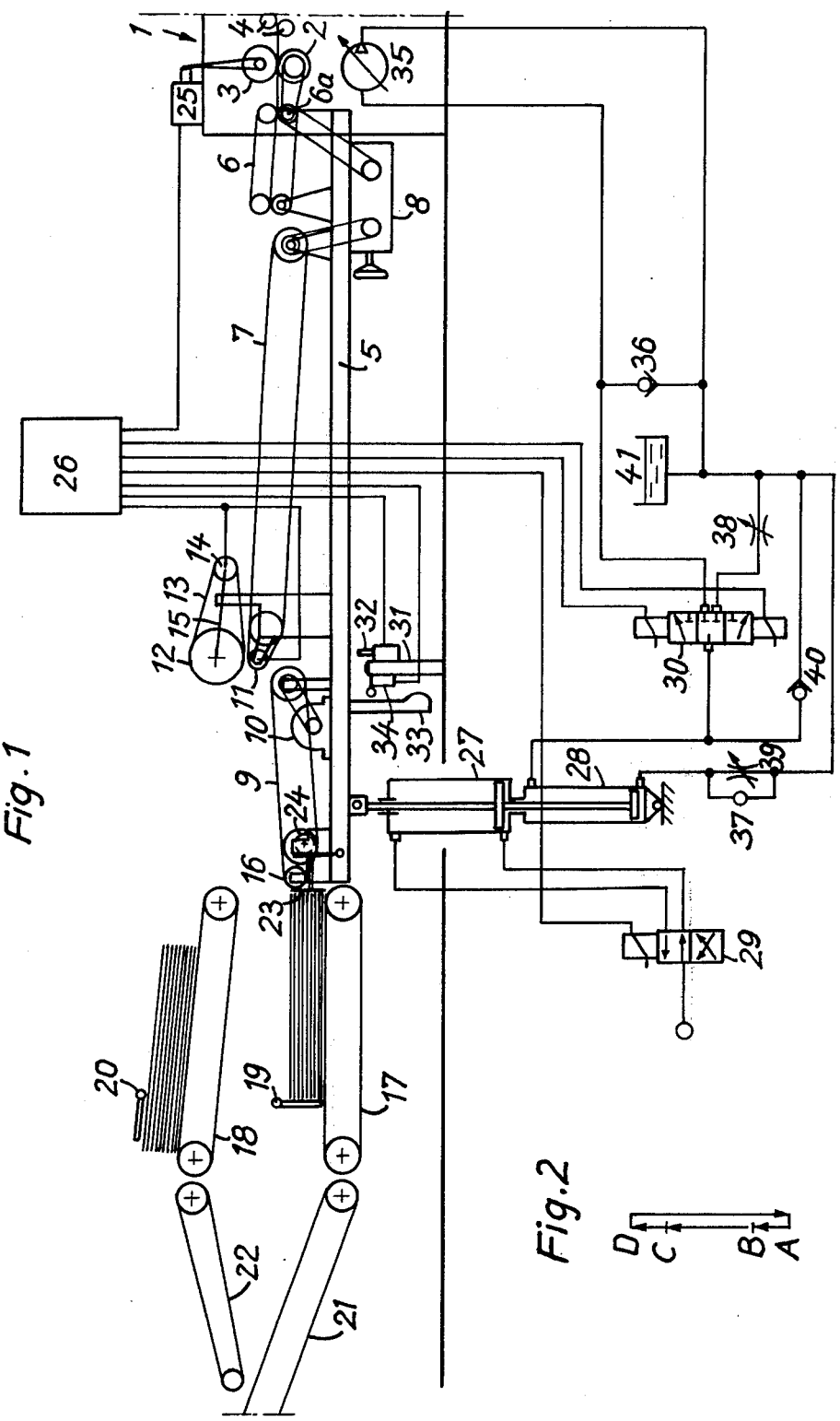

APPARATUS FOR FORMING LOOSE PACKETS OF FLAT WORKPIECES

The invention relates to an apparatus for forming loose packets of predetermined numbers of superposed flat workpieces, especially flattened tubular blanks for making bags, from a row of such workpieces arriving in succession on a first belt conveyor, comprising a second belt conveyor located downstream of the first conveyor and operative at a slower conveying speed than same to transform the row of workpieces to a flow of workpieces in overlapping formation, brake means adjacent the second conveyor effective to engage the workpieces and cause same temporarily to build up and interrupt the flow of the overlapping formation each time the predetermined number of workpieces for a packet has been reached, and a packeting station downstream of the second conveyor including an abutment extending transversely to the conveying direction, means being provided for removing successive completed packets from the packeting station.

Such packet-forming apparatuses are required in the manufacture of paper bags. In this case flattened tubular bag blanks are made in a so-called tube-forming machine from endless flattened paper webs, ejected in the longitudinal direction and then supplied in packets to a base-forming machine through which the bag blanks are conveyed in a transverse direction and made into finished bags. It is essential that the bag blanks in each packet be accurately aligned at their edges prior to insertion in the base-forming machine. Since a tube-forming machine can generally operate twice as fast as a base-forming machine and is therefore able to supply bag blanks to two base-forming machines, the packets of blanks must be formed and aligned very quickly but known packeting apparatus suffers from the following disadvantages.

Whilst a finished packet is being moved out of the packeting station, the flow of overlapping workpieces must be allowed to build up until the packeting station is entirely free. On the other hand, finished packets must not be removed too quickly if the inertia forces are not to upset the edge-to-edge alignment as the finished packet is being accelerated. Any misalignment is particularly disadvantageous in the longitudinal direction of the bag blanks because these blanks are subsequently fed sideways into the baseforming machine. Thus, about 4 to 5 seconds must be allowed for discharging each finished packet until the packeting station is free again, and it is for this time that the overlapping formation of workpieces has to be held up. At a rate of 250 to 300 bag blanks per minute, or 4 to 5 bag blanks per second, this would cause from 16 to 25 bag blanks to build up but this is just about the number of bag blanks to be stacked to form each packet. The packeting operation is therefore not conducted at the packeting station but upstream thereof whilst the bag blanks are building up in the overlapping formation. The misalignment during this build-up can be corrected in the packeting station to only a limited extent, especially since the bag blanks are, during the build-up, pressed closer together and no longer slide over one another very easily. Loose superpositioning of the workpieces is a prerequisite for forming a neat packet from the overlapping formation of workpieces. If an attempt were to be made to reduce the time taken to clear each finished packet from the packeting station, so as to reduce the number of workpieces that build up upstream of the packeting station, a well-formed packet becomes misaligned during acceleration of the latter. If the time for clearing the packeting station is increased, the formation of a packet with aligned workpieces becomes more difficult.

It has been suggested (see German specification No. 1,586,350) that the row of successive workpieces might be sub-divided by diverting means which deliver the workpieces alternatively to an upper conveyor and a lower conveyor on which the respective sub-divided rows are then transformed to assume overlapping formations which are subsequently fed to separate packeting stations. Such an arrangement produces well-aligned packets because there is now sufficient time for the packets to leave the respective packeting stations and there is no need to hold up the overlapping flow, but the arrangement is more expensive because a lot of the equipment has to be duplicated. Also, such an arrangement is not ideal for tube-making machines working at high production rates because the time interval between successive workpieces is then very short, leaving little time for the diverting means to become operative. At a rate of 300 workpieces per minute and a gap of 5 percent between adjacent workpieces, the time taken for a gap to pass the tip of a diverter is only 10 milliseconds. During this short time interval it is not only necessary that the diverting means be operated but they must also be controlled so that the actual diversion takes place during this time interval.

The present invention aims to provide a packeting apparatus by which the workpieces of the packet are well aligned but which is relatively inexpensive.

According to one aspect of the present invention, apparatus for forming loose packets of predetermined numbers of superposed flat workpieces from a row of such workpieces arriving in succession on a first belt conveyor comprises a second belt conveyor located downstream of the first conveyor and operative at a slower conveying speed than same to transform the row of workpieces to a flow of workpieces in overlapping formation, brake means adjacent the second conveyor effective to engage the workpieces and cause same temporarily to build up and interrupt the flow of the overlapping formation each time the predetermined number of workpieces for a packet has been reached, and two packeting stations downstream of the second conveyor each including an abutment extending transversely to the conveying direction, wherein the positions of the packeting stations relatively to the second conveyor are adjustable so that the overlapping flow is directed alternately to one said station and the other.

By providing two alternately fed packeting stations, removal of each packet can be effected sufficiently slowly and there will even be enough time to allow a finished packet to settle. The time taken for moving the second conveyor from one packeting station to the other can be kept quite short, for example 1 to 2 seconds, and thus the hold-up in the flow of overlapping workpieces will be correspondingly short, the loose disposition of the workpieces in the overlapping formation is maintained, and unimpeded transfer of each workpiece out of the overlapping formation to the packeting station is ensured, with a good alignment of the workpieces in the packets being formed. The packeting stations may be superposed at a vertical spacing from one another and the second conveyor may be pivotable together with the brake means.

To permit the surface of the second conveyor to be maintained at substantially the same level as the top of a growing packet or stack of workpieces without the need for compensating the height, a pivoting drive for the second conveyor may be equipped with rapid drive means for pivoting the second conveyor rapidly through the vertical spacing between the packeting stations and follow-up drive means for pivoting the second conveyor in conformity with the growth of a packet, the packeting stations being disposed at respectively fixed locations.

In one form of the invention, the second conveyor comprises two belt conveyor means disposed one upstream of the other and capable of operating at a slower speed than the other, the brake means being disposed adjacent the said upstream belt conveyor means. In this way the transfer of each workpiece from the downstream belt conveyor means to an empty packeting station after the temporary hold-up in the flow of the overlapping formation will take place at the same speed as at other times. Also, this construction permits the degree of overlap between the workpieces to be chosen independently of the speed at which the workpieces are transferred to the packeting station. The belt conveyor means of the second conveyor are preferably independently driven.

According to another aspect of the present invention, apparatus for forming loose packets of predetermined numbers of superposed flat workpieces from a row of such workpieces arriving in succession on a first belt conveyor comprises a second belt conveyor located downstream of the first conveyor and operative at a slower conveying speed than same to transfer the row of workpieces to a flow of workpieces in overlapping formation, brake means adjacent the second conveyor effective to engage the workpieces and cause same temporarily to build up and interrupt the flow of the overlapping formation each time the predetermined number of workpieces for a packet has been reached, a packeting station downstream of the second conveyor including an abutment extending transversely to the conveying direction, and means for removing successive completed packets from the packeting station, wherein an auxiliary stacking surface movable towards and away from a position below the downstream end of the second conveyor is provided adjacent the packeting station, drive means for said auxiliary surface being effective to move same over the packeting station during said interruption in the flow of the overlapping formation and cause same to remain there until a completed packet has been entirely removed from the packeting station.

The auxiliary stacking surface, which may be formed by a rake, can be very rapidly moved to a position above the packeting station. The latter is preferably provided with height compensating means so that, when a completed packet has been moved away, the packeting station can be raised from the lowered position to the level of the auxiliary surface where it then takes over from the auxiliary surface by supporting a packet in the process of being formed, whereupon the auxiliary surface is withdrawn from beneath the stack to an inoperative position, possibly with the aid of a stationary stripper.

Space is saved by locating the auxiliary stacking surface and constructing it to be movable in the conveying direction of the workpieces. A particularly small difference in height between the top of the belt conveyor and the auxiliary stacking surface is obtained if the latter and its drive are disposed within the loop of a conveyor belt of the second conveyor. The height difference is chosen to be slightly larger than the height reached by a stack during the intervening period, so that the auxiliary stacking surface need not be equipped with a drive for effecting a follow-up movement during lowering. The actual packeting station in this second aspect of the invention should, however, be provided with a follow-up drive for height compensation so that the top of the packet being formed will always be spaced a certain distance beneath the conveying plane. This will facilitate the formation of very high packets or stacks containing a large number of workpieces.

Examples of the invention will now be described with reference to the accompanying drawings, wherein:

FIG. 1 is a diagrammatic side elevation of one form of packeting apparatus;

FIG. 2 is a diagram indicating the disposition of the downstream end of the second conveyor during the formation of two successive packets.

Figure 3:
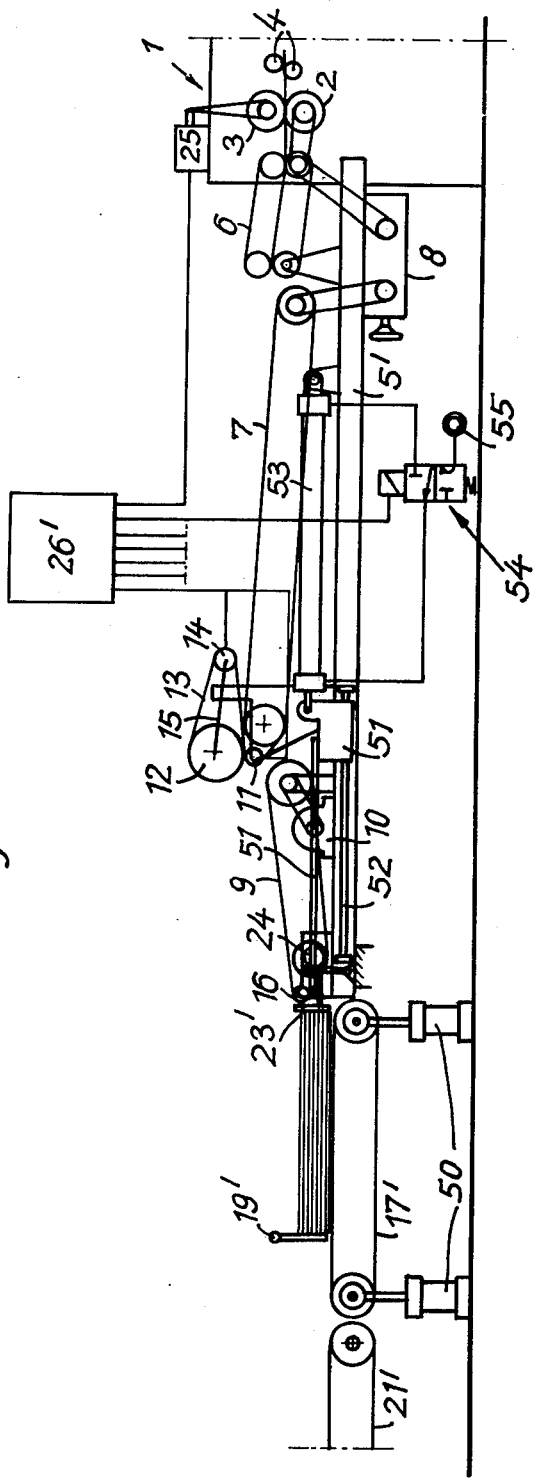
FIG. 3 is a diagrammatic side elevation of a second form of packeting apparatus.

The packeting apparatus of FIGS. 1 and 2 is disposed downstream of a tube-forming machine 1 for making flattened tubular blanks to be used in the manufacture of bags. Only a terminal portion of the tube-forming machine is illustrated, namely a pair of tear-off rolls 2, 3, of which the upper roll 3 is reciprocatable towards and away from the roll 2, and a pair of lead-in rolls 4. These rolls rotate more rapidly than the feeding speed of a tubular web from the leading end of which the bag blanks are successively severed. Accordingly, each severed bag blank is dispatched more rapidly than the new leading end of the web and the severed bag blanks are ejected in a row and at a close spacing to one another.

Referring to FIG. 1, the packeting apparatus comprises a swing conveyor 5 pivotable at one end about a central axis 6a of a drive for a delivery belt conveyor 6 and adapted to be raised and lowered at the other end by means of a pneumatic cylinder 27. The packeting apparatus also comprises two packeting stations represented by conveyor belts 17 and 18, having pivotable abutment flaps 19 and 20, respectively.

The swing conveyor 5 consists of the delivery conveyor belts 6, which constitute a first conveyor driven by the lower tear-off roll 2 at a somewhat higher speed than the latter, and a second conveyor which, in turn, comprises two belt conveyor means 7 and 9. The conveyor means 7 are driven through control gearing 8 by the lower tear-off roll 2 at a substantially lower speed than the latter (for example 20 to 40 percent). The belt conveyor means 9 are driven by a variable speed motor 10 at a selected constant speed which is substantially higher than that of the conveyor means 7 but still less than the speed at which the bag blanks are torn off the web in the tubeforming machine.

The swing conveyor 5 further comprises a supporting roll 11 having as small a diameter as possible driven by the conveyor means 7 through a friction clutch (not shown) and capable of being stopped by an electromagnetically-operated multiple-disc friction brake (not shown), and two or more coaxial guide rolls 12 connected to a corresponding number of rolls 14 by belts 13. The rolls 14 can likewise be stopped by electromagnetically-actuated multiple-disc friction brakes (not shown). The guide rolls 12 and rolls 14 are pivotally mounted on levers 13 so that they can rest on the supporting roll 11 under their own weight.

The aforementioned belt conveyor means 9 are disposed downstream of the supporting roll 11 at a slightly lower elevation and they drive a supporting roll 16 at the same speed. Beneath the supporting roll 16 there is a pivotable aligning plate 23 which is oscillated by an eccentric 24 driven by the conveyor means 9.

The function of the various conveyor belts on the swing conveyor 5 is as follows. The bag blanks severed by the tear-off rolls 2 and 3 travel in a row at a close spacing to one another through the delivery conveyor 6 by which they are deposited in an overlapping formation on the conveyor means 7. The degree of overlap remains constant irrespective of the speed of the tube-forming machine because the belts of the conveyor 6 and conveyor means 7 are driven at a speed proportional to that of the tube-forming machine. The degree of overlap can be adjusted by the control gearing 8.

The overlapping formation of bag blanks passes the supporting roll 11 and thereby drives the rolls 12, 14 and belts 13 under friction. Downstream of the supporting roll 11, the bag blanks drop onto the more rapidly moving belt or belts of the conveyor means 9 which throw them at a selected constant speed onto the conveyor belt of either of the packeting stations against the respective abutment flap 19 or 20, the oscillating aligning plate 23 being effective to align the bag blanks accurately as a packet or stack of the blanks is formed at the packeting station.

The number of bag blanks may be counted by an electric counter 25 actuated by the reciprocating upper tear-off roll 3. When a preselected number has been reached, an impulse is transmitted to a control device 26. At this instant the magnetic brakes of the supporting roll 11 and the rolls 14 are actuated. This stops feeding of the overlapping bag blanks that happen to be disposed between the supporting roll 11 and guide rolls 12 but any bag blanks on the downstream conveyor means 9 continue to be fed to the appropriate packeting station. The leading bag blanks on the conveyor means 7 are during this short time pushed together under the belts 13 to overlap to a greater extent. During this temporary interruption in the flow of the overlapping formation of bag blanks, the unpivoted end of the swing conveyor 5 is raised or lowered to the level of the empty packeting station at which a new packet is to be formed. Even whilst the conveyor 5 is being so adjusted, the magnetic brakes of the supporting roll 11 and rolls 14 are released so that the leading edge of the leading bag blank in the overlapping formation will have reached the supporting roll 16 by the time that the swing conveyor 5 has assumed its new position.

As a new packet is now being formed at the second packeting station, the previously-formed packet settles, that is to say any air that was included between the large areas of the adjacent bag blanks as they were flung to the packeting station is pressed out under the weight of the superposed bag blanks in the packet, thereby reducing the danger of sliding and consequent misalignment of the packet as it is discharged from the packeting station. After the abutment flap 19 or 20, as the case may be, has been swung out of the way and the belt 17 or 18 simultaneously set into motion, the completed packet is discharged and taken away by a conveyor 21 or 22.

Lifting and lowering of the unpivoted end of the swing conveyor 5 in FIG. 1 will now be described with the aid of the diagram of FIG. 2. On commencement of the formation of a packet on the conveyor belt 17, the supporting roll 16 of the swing conveyor 5 is at its lowermost position A at a level which is a little higher than the conveying run of the belt 17. As the packet grows, the supporting roll 16 is lifted slowly at a follow-up speed which is proportional to the machine speed, whereby the top of the roll 16 will always be located a certain distance above the surface of the growing packet. This ensures that the bag sections will always be deposited under the same conditions, no matter how far the packet has grown. When the desired number of bag blanks in the packet has been reached and the last bag blank on the conveyor means 9 has arrived on the packet, the supporting roll 16 will be at the position marked B. Whilst the flow of the overlapping formation of bag blanks on the conveyor means 9 is now being interrupted, the supporting roll 16 is moved at a rapid speed to the position C, at which the roll 16 will be located relatively to the conveyor belt 18 in the same way as it had been relatively to the belt 17 at the position A. Following resumption of the flow of overlapping bag blanks, a new packet now starts to form on the conveyor belt 18 and the supporting roll 16 is lifted gradually at a follow-up speed until it reaches the position D. At this time, the packet that had been formed on the belt 17 will have been discharged via the conveyor 21 and, after the flow of overlapping bag blanks on the conveyor means 9 has been stopped, the supporting roll 16 is very rapidly lowered to its starting position A by pivoting of the swing conveyor 5. The lifting stroke B-C and the lowering stroke D-A can be effected very rapidly indeed and therefore the required temporary interruption in the flow of overlapping bag blanks from the conveyor means 9 will be very short.

Control of the lifting and lowering movement is as follows. The force required for lifting and lowering the unpivoted end of the swing conveyor 5 is applied by a pneumatic cylinder 27, the direction of movement of which is determined by the control device 26 acting through an air valve 29. Connected to the pneumatic cylinder 27 there is a hydraulic cylinder 28 by means of which the direction of movement of the swing conveyor 5 is determined by reason of controlling the speed of return flow of the liquid from the hydraulic cylinder 28 to a compensating vessel 41. The supply of the hydraulic liquid to the opposite side of the piston can be effected through relief valves. Switching to the various operating speeds or stopping the movement altogether when the machine is brought to a standstill can take place by the control device 26 acting through a valve 30. The slow lifting movements A-B and C-D in proportion to the machine speed are controlled by a dosing pump 35 which is coupled to the tube-forming machine and can be regulated thereby, the upper side of the piston of the cylinder 28 being connected to the pump 35. The rapid lifting movement B-C is effected in similar manner by an adjustable throttle 38, whilst an adjustable throttle 39 controls the rapid lowering movement D-A. Relief valves 37 and 40 permit unimpeded return flow of the liquid from the compensating vessel 41 into the cylinder 28 during the rapid movements B-C (38) or D-A (39), and a relief valve 36 permits unimpeded circulation of the liquid through the dosing pump 35 when the latter is separated during the rapid lifting and lowering movements.

The proper setting of the points A and C at which the follow-up speeds are initiated subsequent to rapid movement are effected by an adjustable abutment 31 and terminating switch 32 (in the case of the point A) and by an adjustable cam 33 for actuating a switch 34 (in the case of the point C). Switches 32 and 34 likewise act on the control device 26 which determines the transition from rapid movement to slow movement via the valve 30.

FIG. 3 illustrates an example of a packeting apparatus according to the second aspect of the present invention. The apparatus is very similar to that in FIG. 1 and like parts are designated by the same reference numerals as used in FIG. 1 whilst parts which correspond to those already described in relation to FIG. 1 bear the same reference numerals with an index stroke. In the FIG. 3 embodiment, the conveyor 5' is not pivotable, i.e., the conveyor means 7 and 9 and brake arrangement 11–15 are at a fixed location. Instead, a single packeting station represented by the belt conveyor 17' having a transverse abutment 19' and followed by a conveyor 21' is adjustable for height with the aid of a piston-cylinder arrangement 50. The control device 26' is therefore modified in comparison with the device 26 of FIG. 1.

The conveyor means 9 comprise a plurality of spaced parallel conveyor belts and includes a rake 51 displaceable lengthwise of the belts along a guide 52. The prongs of the rake 51 engage between the belts of the conveyor means 9 and between the individual guide rolls thereof. The rake is spaced from the level of the conveying runs of the belts of the conveyor means 9 by a distance which is somewhat larger than the height of the packet to be formed. The rake is reciprocated by a pneumatic cylinder 53 of which the pressure chambers can be connected to a pressure source 55 via a valve 54. Electromagnetic actuation of the valve 54 is effected by the control device 26'.

When the predetermined number of bag blanks as counted by the counter 25 has been reached and communicated to the control device 26', the components 11–15 are, as in the case of FIG. 1, effective to interrupt the flow of overlapping bag blanks on the conveyor means 7 and the short time of this interruption is utilised to lower the packeting station, swing the abutment 19' upwardly and push the rake 51 under the action of the cylinder 53 to a position above the finished packet. The aligning plate 23' is also in the form of a rake to make this possible. The transverse abutment 19' possesses a small auxiliary abutment which, upon swinging the main abutment to a horizontal position, assumes an effective vertical position and, together with the rake 51, forms a rapidly effective auxiliary packeting station above the previously completed packet. Whilst the packet below the rake now settles, the brake means 11–15 are released again and the bag blanks for a new packet are begun to be stacked on the rake 51 at the auxiliary packeting station. After the previous packet has settled sufficiently and been gently removed from the packeting station, the conveyor 17' is raised to take over the stack that has started to form on the rake 51. The rake 51 can now be returned to a position below the conveyor means 9, the aligning plate 23' being of assistance in this operation in that it acts as a stripper. If the conveyor 17' is composed of belts spaced to coincide with the gaps between the prongs of the rake 51, the conveyor 17' can take over the entire weight of the packet that was being formed on the rake 51 and no upsetting forces will be created as the rake is pulled out.

We claim:

1. Apparatus for forming packets of predetermined numbers of superposed flat workpieces from a row of such workpieces arriving in succession from a workpiece forming apparatus, comprising a movable first belt conveyor located downstream of the forming apparatus operating at a slower conveying speed than the arrival speed of said workpieces to transform the row of workpieces to a flow of workpieces in overlapping formation, brake means downstream from said forming apparatus adjacent the first belt conveyor effective to engage the workpieces and cause same temporarily to build up and interrupt the flow of the overlapping formation each time the predetermined number of workpieces for a packet has been reached, and two packeting stations spaced from one another downstream of the first conveyor each including an abutment means, and means for moving the position of the first belt conveyor relative to the packeting stations so that the overlapping flow is directly alternately to one said station and the other.

2. Apparatus according to claim 1, wherein the packeting stations are superposed at a vertical spacing from one another and the first conveyor and the brake means are pivotable.

3. Apparatus according to claim 2 further including a pivoting drive means for pivoting the second conveyor rapidly through the vertical spacing between the packeting stations, means for controlling said pivoting drive means, and follow-up drive means for pivoting first conveyor in conformity with the growth of a packet, and wherein the packeting stations are disposed at respectively fixed locations.

4. Apparatus according to claim 1, wherein the first conveyor comprises two belt conveyor means disposed one upstream of the other and capable of operating at conveying speeds different from each other, the said brake means being disposed adjacent the said upstream belt conveyor means.

5. Apparatus according to claim 4, wherein the belt conveyor means are independently driven.

6. Apparatus for forming packets of predetermined numbers of superposed flat workpieces from a row of such workpieces arriving in succession from a workpiece forming apparatus, comprising a first belt conveyor means located downstream of the forming apparatus and operating at a slower conveying speed than the arrival speed of said workpieces to transform the row of successive workpieces arriving from said forming apparatus to a flow of workpieces in overlapping formation, brake means downstream of said forming apparatus adjacent the first conveyor means effective to engage the workpieces and cause said workpieces temporarily to build up and interrupt the flow of the overlapping formation each time a predetermined number of workpieces for a packet has been reached, a vertically movable packeting station downstream of the first conveyor means including an abutment means, and means for removing successive completed packets from the packeting station, an auxiliary stacking surface movable toward and away from a position below the downstream end of the first conveyor means provided adjacent the packeting station, drive means for said auxiliary surface to move said auxiliary surface over the packeting station during said interruption in the flow of the overlapping formation and cause said workpieces to remain on said auxiliary stacking surface until a complete packet has been entirely removed from the packeting station.

7. Apparatus according to claim 6, wherein the auxiliary surface is formed by a rake.

8. Apparatus according to claim 7, wherein the first conveyor comprises two belt conveyor means disposed one downstream of the other and the said downstream conveyor means comprise a plurality of spaced parallel belts passing over separate rollers, the rake and operating means therefor being disposed beneath the conveying runs of the belts and the rake having prongs engaging between the separate rollers.

9. The apparatus of claim 6, further including means for controlling the operation of said auxiliary stacking surface and said moveable packeting station in response to the number of workpieces arriving from said forming apparatus.

10. The apparatus of claim 6 wherein said brake means comprises:
  a supporting roll adjacent said first belt conveyor and driven thereby engaging the workpieces being transported by said first belt conveyor;
  guide rolls pivotally mounted to engage said supporting roll and be frictionally driven thereby;
  belts adjacent said first belt conveyor connecting said guide rolls; and
  second brake means for stopping said supporting roll and said guide rolls thereby stopping the feed of workpieces disposed between said supporting roll and said guide rolls, and allowing a build-up of workpieces between said first belt conveyor and said belts.

11. The apparatus of claim 6, further including a second conveyor means conveying workpieces arriving from said workpiece forming apparatus to said first conveyor means.

12. Apparatus for forming packets of predetermined numbers of superposed flat workpieces from a plurality of such workpieces arriving in successive fashion from a workpiece forming apparatus comprising:
  at least two spaced apart packeting stations downstream of the forming apparatus, each selectively receiving workpieces and each including an abutment means;
  a moveable frame means adapted to move into a position adjacent each of said spaced apart packeting stations;
  a first conveyor means on said moveable frame means conveying the workpieces arriving from said workpiece forming apparatus to said packeting stations, said first conveyor means operating at a slower conveying speed than said workpieces are arriving from said workpiece forming apparatus to transform the flow of workpieces from the successive fashion into an overlapping fashion;
  brake means mounted on said moveable frame means adjacent said first conveyor means operative to engage and temporarily interrupt the flow of overlapping workpieces being conveyed on said first conveyor means to form a temporary packet of said workpieces;
  frame moving means for moving said frame means from adjacent one packeting station to adjacent another;
  control means responsive to the number of workpieces arriving from the workpiece forming apparatus controlling said brake means and said frame moving means causing said brake means to become operative each time a predetermined number of workpieces has arrived from said workpiece forming apparatus and to operate said frame moving means to move said moveable frame from adjacent one packeting station to adjacent another; and
  actuating means actuated while said moveable frame means is moving causing said brake means to disengage from said workpieces whereby the flow of said overlapping workpieces on said first conveyor means is resumed.

13. The apparatus of claim 12, further including a second conveyor means conveying workpieces arriving from said workpiece forming apparatus to said first conveyor means.

* * * * *